United States Patent [19]

Stapp et al.

[11] Patent Number: 5,545,856
[45] Date of Patent: Aug. 13, 1996

[54] DISTRIBUTION SYSTEM FOR A COMBINATION WEIGHER OR THE LIKE

[75] Inventors: Richard E. Stapp, San Lorenzo; Glenn A. Hayes, Hayward, both of Calif.

[73] Assignee: The Paxall Group, Inc., Skokie, Ill.

[21] Appl. No.: 178,852

[22] Filed: Jan. 7, 1994

[51] Int. Cl.$^6$ .......................... G01G 13/00; B65G 37/00
[52] U.S. Cl. .................. 177/25.18; 177/161; 177/162; 177/DIG. 11; 198/601; 222/286
[58] Field of Search .................................. 177/25.18, 98, 177/116, 161, 162, DIG. 11; 222/198, 200, 286, 290; 198/601, 609

[56] References Cited

U.S. PATENT DOCUMENTS

| | | | |
|---|---|---|---|
| 3,300,098 | 1/1967 | Quester et al. | |
| 3,710,980 | 1/1973 | Henry | 222/64 |
| 4,313,507 | 2/1982 | Hays | 177/1 |
| 4,418,771 | 12/1983 | Henry et al. | 177/1 |
| 4,538,692 | 9/1995 | Henry et al. | 177/25.18 |
| 4,545,509 | 10/1985 | Musschoot et al. | 222/198 |
| 4,653,674 | 3/1987 | Kihara et al. | 222/198 X |
| 4,764,695 | 8/1988 | Inoue et al. | 310/20 |
| 4,825,896 | 5/1989 | Mikata | 177/25.18 |
| 4,941,565 | 7/1990 | Hirota et al. | 198/601 |
| 5,211,253 | 5/1993 | Davis, Jr. | 177/25.18 |
| 5,270,495 | 12/1993 | Mosher et al. | 177/25.18 |

Primary Examiner—Peter S. Wong
Assistant Examiner—Randy W. Gibson
Attorney, Agent, or Firm—Bacon & Thomas

[57] ABSTRACT

A product distribution system includes a cone shaped member for receiving a mass of solid flowable product thereon and a pair of concentric downwardly extending cylindrical walls. A top portion of the first of the downwardly extending cylindrical walls is adjacent to and abutting the base of the cone shaped member. A plurality of circularly arranged electromagnetic feeders which extend outwardly in a radial direction from the cone shaped member are disposed below the cone shaped member at the bottom of the first cylindrical wall, and in close proximity thereto, for moving product away from the first cylindrical wall and toward a plurality of circularly arranged weigh hoppers. The second cylindrical wall or retaining member has a diameter which is greater than the first cylindrical wall and together with the first wall forms a circular trough at the base of the cone shaped member. The second cylindrical wall is adjustably disposed above the circularly arranged feeders in a vertical direction to control the volume of product flowing thereunder in a given amount of time. In addition, a curved skirt is provided at the base of the second cylindrical wall to aid in the flow of product.

9 Claims, 3 Drawing Sheets

006
DISTRIBUTION SYSTEM FOR A COMBINATION WEIGHER OR THE LIKE

FIELD OF THE INVENTION

This invention relates to a distribution system or device for use in a combination weigher, of the type having a plurality of generally circularly arranged weigh hoppers, or the like and, more particularly to a distribution system for delivering a relatively uniform quantity of flowable solid product to each of a plurality of the weigh hoppers.

BACKGROUND FOR THE INVENTION

Combination weighing systems of the type having a plurality of circularly arranged weigh hoppers are well known. For example, the Henry et al. U.S. Pat. No. 4,418,771 discloses a system wherein a predetermined weight of product is made up of individual articles of varying weights. In the Henry method and apparatus, the predetermined weight is reached by selecting the product stored in a combination of a predetermined number of storage cups. Quantities of the product having targeted weights are distributed to a plurality of scale-controlled hoppers for accurate weighing. The weighted product is fed from each of the scale-controlled hoppers to a plurality of storage cups associated with each of the hoppers, and the product weight associated with each storage cup is registered. Specific combinations of storage cups are tested to determine whether the combined product weights therein add up to make the desired weight, within acceptable limits. The first combination found to make the weight is used, and the appropriate storage cups are emptied to a container for receiving the product. The appropriate storage cups are refilled from the scale, and the process repeats. When none of the combinations of the preselected number of storage cups include a total product weight within the acceptable limits, the limits are broadened and the cycle repeats. The weighing system includes a programmed microprocessor for controlling operation thereof, for providing the combination to be tested, for calculating the combined weights, and for determining whether the combined weight falls within the acceptable limits. A distributor for the product includes a reversing rotating portion for preventing clogging of the product at openings provided for chutes connecting the distributor to the scale-controlled hoppers.

A more recent approach to an improved combination weigher is disclosed in the U.S. Pat. No. 5,211,253 of Russel Davis which is assigned to the same assignee as the present application and which is incorporated herein in its entirety by reference. As disclosed by Davis, the apparatus comprises means including a plurality of balances each of therefrom to contribute to a delivery. The apparatus also includes means for recording a predetermined target weight and control means for determining which of the balances are in a ready or stable state. Means are also provided for generating the values of combinations of weights on the balances which are in the ready sate and for comparing the values with the predetermined target weight and for selecting a combination of balances to be unloaded to deliver a collection of articles having a combined weight which most nearly approximates the target weight. In practice, it may be desirable to select those scales having a combined weight which is at least equal to the predetermined weight to avoid any underweight packages. The apparatus also includes package positioning and signal generating means such as a packaging machine for positioning a package to receive a collection of articles from the selected balances and for generating a signal to indicate that a package is positioned to receive the articles from the balances. Means for unloading the balances of the selected combination for delivery of the product contained therein to a properly positioned package are also provided. Means for generating the values of combinations of weights on the balances which are in the ready state including the originally selected balances and any balances which have reached a ready state subsequent to a first comparison are actuated for comparing the values with the predetermined target weight. In this manner, all of the ready balances are included in the comparison and a second selection having a weight which most nearly approximates the target weight is delivered to a package. Means are also provided for refilling those balances which have been unloaded.

Combination weighers as mentioned above also incorporate a distribution system for delivering solid flowable product to the plurality of scales. In such distribution systems, a cone shaped member is located directly above the infeeds for a plurality of feeders. In such devices a relatively deep pile of product may form on the cone shaped member. This pile of product then exerts an outward force on the product that causes the product to surge outwardly causing inconsistent or non-uniform feeding. The result is that there is a relatively large variance between the weights on the various scales. At times, such surges also lead to clogging of the product which requires a mechanism for preventing and/or breaking up any clogging or bridging which may occur. An example of an anti-clogging mechanism is disclosed in the aforementioned U.S. Pat. No. 4,418,771.

It has now been found that the performance of combination weighers can be improved by means of an improved distribution system of the type disclosed herein. Such systems provide a more uniform distribution of product, less variance in the weighed product, reduce the likelihood of clogging and thus obviate a need for an anticlogging mechanism. In addition, it is now believed that such systems may eliminate the need to rotate and/or vibrate the distribution cone and therefore, reduce the cost and complexity of the resulting combination weighers, minimize the need for maintenance and result in a more durable system.

BRIEF SUMMARY OF THE INVENTION

In essence, the invention contemplates a product distribution system for a combination weigher or the like. Such weighers may, for example, include a plurality of generally circularly arranged weigh hoppers which are disposed below the distribution system. The distribution system comprises delivery means or chute for delivering a mass of solid flowable product and a cone shaped distribution member having an apex and a generally circular base at the bottom thereof for receiving a mass of solid flowable product from the delivery means. The cone shaped distribution member is disposed above the combination weigher and a first coaxial cylindrical wall abuts the base of the cone shaped member and extends downwardly therefrom. A plurality of radically arranged feeders are disposed below the first circular wall but in close proximity thereto and extend radially outwardly therefrom for moving product that falls from the cone shaped member toward the circularly arranged weigh hoppers. A second coaxial circular wall or retaining member having a diameter, which is greater than the diameter of the first cylindrical wall, is disposed above the circularly arranged feeders at a distance to allow a limited amount of product to flow thereunder. In a preferred embodiment of the invention, a curved plate at the base of the second cylindrical wall to aid in the flow of the product to the weigh hoppers. The preferred embodiment of the invention also includes means for adjusting the distance between the bottom of the second circular wall and the circularly arranged feeders.

The invention will now be described in more detail in connection with the accompanying drawings wherein like reference numerals have been used to indicate like parts.

DESCRIPTION OF THE PREFERRED EMBODIMENTS OF THE INVENTION

This invention relates to a combination weigher and, especially, to a combination weigher having radially arranged weigh hoppers.

Figure 1:
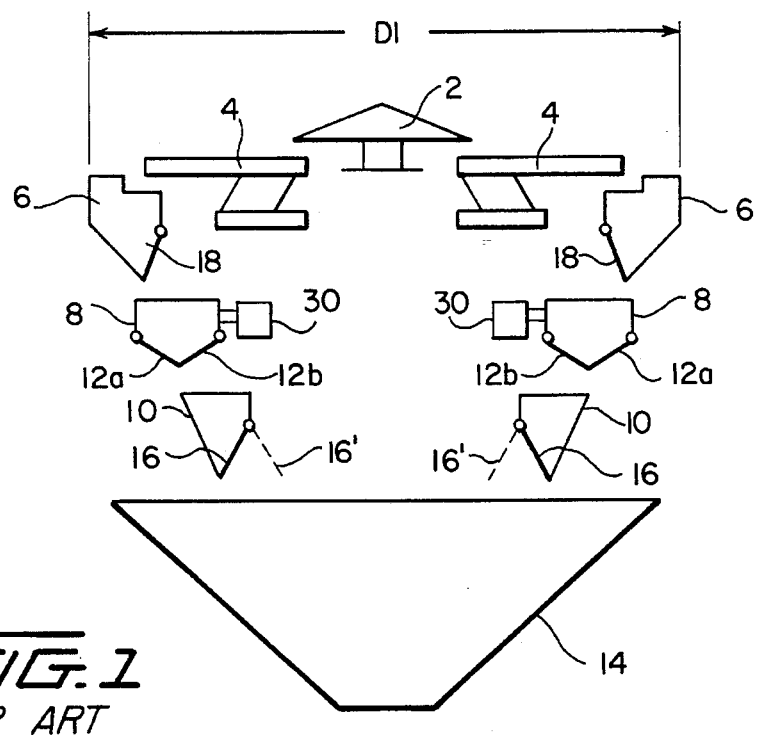
FIG. 1 is a schematic side view illustrating a prior art combination weigher which includes a conventional distributing system.
Figure 2:
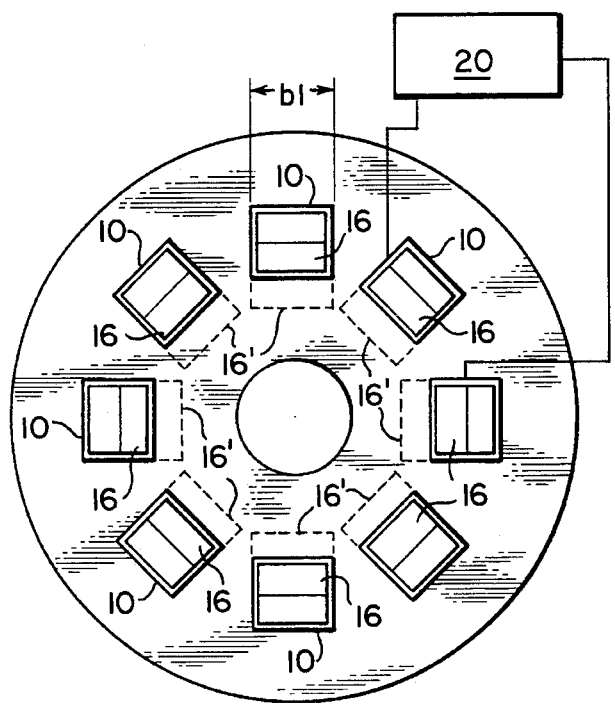
FIG. 2 is a sectional plan view along line I—I of FIG. 1 with the control means shown schematically.

FIGS. 1 and 2 show a prior art combination weigher. As shown, a plurality of electromagnetic feeders 4 are radially arranged around a conventional dispersion feeder 2 and a feed hopper 6 is disposed under the distal end of each electromagnetic feeder 4. A weight hopper 8 is disposed under each feed hopper 6 and an auxiliary hopper 10 is disposed under each weight hopper 8. The feed, weight and auxiliary hoppers 6, 8 and 10 are respectively arranged angularly in concentric fashion. Each weight hopper 8 has an outer gate 12a for discharging product directly downward and an inner gate 12b for feeding product into the underlying auxiliary hopper 10. Accordingly, the auxiliary hoppers 10 are arranged angularly under the inner gates 12b. A collection chute 14 is disposed under the auxiliary hoppers 10 for collecting product which is discharged from weight hoppers 8 and/or auxiliary hoppers 10. Each auxiliary hopper 10 has a discharge gate 16 adapted to open inwardly as shown in phantom 16' and each feed hopper 6 also has a similar discharge gate 18.

A combination weigher with the aforementioned arrangement of weight hoppers 8 and auxiliary hoppers 10 requires a collection chute of relatively large diameter at its upper end. On the one hand, assuming the gate 16' of each auxiliary hopper 10 has a width b1 as shown in FIG. 2, the auxiliary hoppers must be positioned so that the lower edges of the opened gates 16' never project inwardly beyond a corresponding regular polygon having a side length b1, in order to ensure that the gate 16' of each hopper may open without any interference from the other gates 16. On the other hand, since each auxiliary hopper 10 is disposed directly under the inner gate 12b of a corresponding weight hopper 8, the collection chute 14 must have a diameter sufficiently large to completely collect the product discharged from the outer gates 12a of weight hoppers 8. While the gate width b1 may be reduced to remove the abovementioned problem, this will result in reduction of the flow rate of product which causes undesirable reduction in machine efficiency. Although the flow rate can be maintained by increasing the height of gage 16, this will result in undesirable increase in the machine height.

The box 20 shown schematically in FIG. 2, includes means for recording a target weight, control means for determining which of the weigh hoppers is in a ready state as well as generating and comparison means for generating the combination of weights in the weight hoppers which are in the ready state and comparing the values with the predetermined target weight. The system in box 20 also includes means for selecting a combination of weight hoppers having a combined weight which most nearly approximates the target weight. The box 20 also includes means for dumping the selected weight hoppers and for initiating a refilling of those hoppers. The details of the aforementioned means are clearly shown and described in the aforementioned patents on combination weighers which are incorporated herein by reference. Such means are within the skill of a person of ordinary skill in the art. It should also be recognized that the distribution system disclosed and claimed herein may be used in connection with combination weighers of other designs as well as in other applications wherein solid flowable product is delivered to a plurality of locations in a relatively uniform amount.

Figure 3:
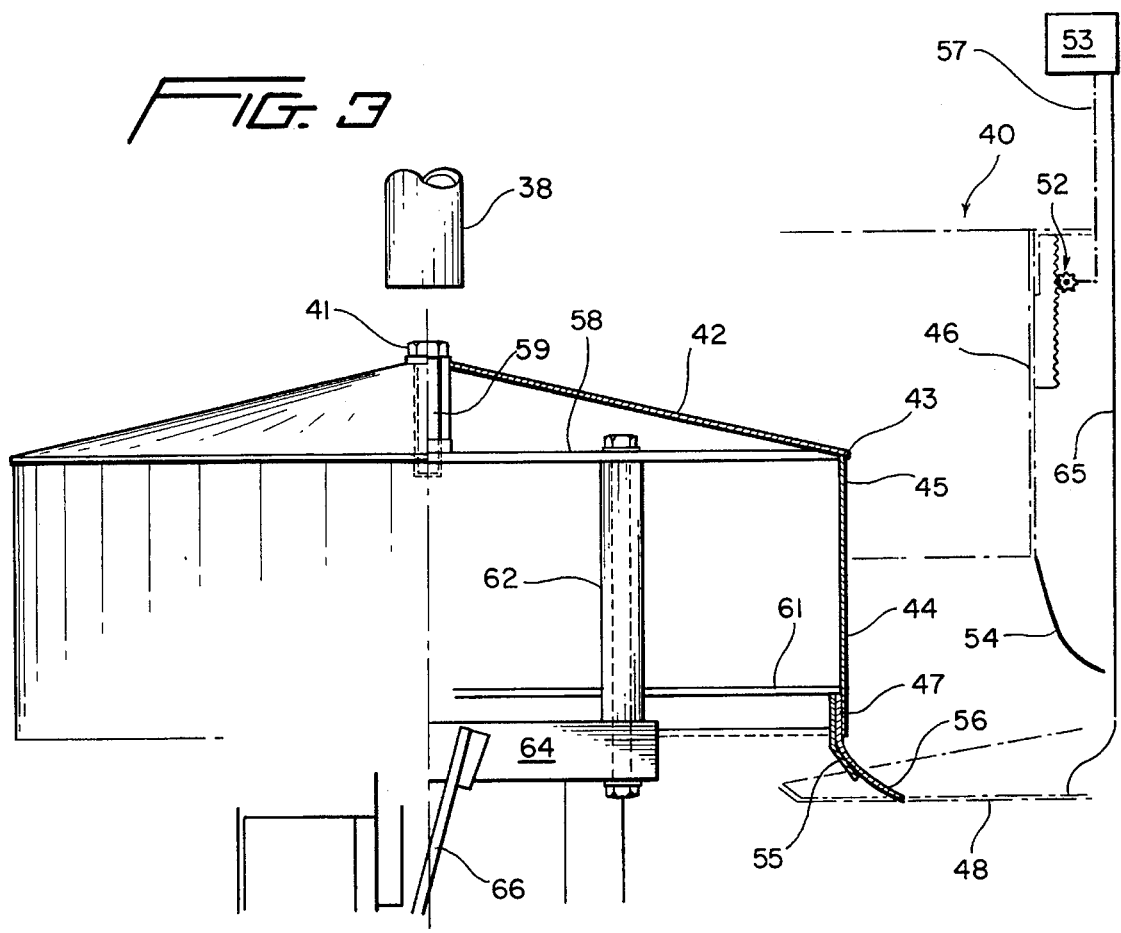
FIG. 3 is a schematic side view of an improved distributing system in accordance with the present invention; and, FIG. 4 is a top or plan view of the improved distribution system in accordance with the present invention.
Figure 4:
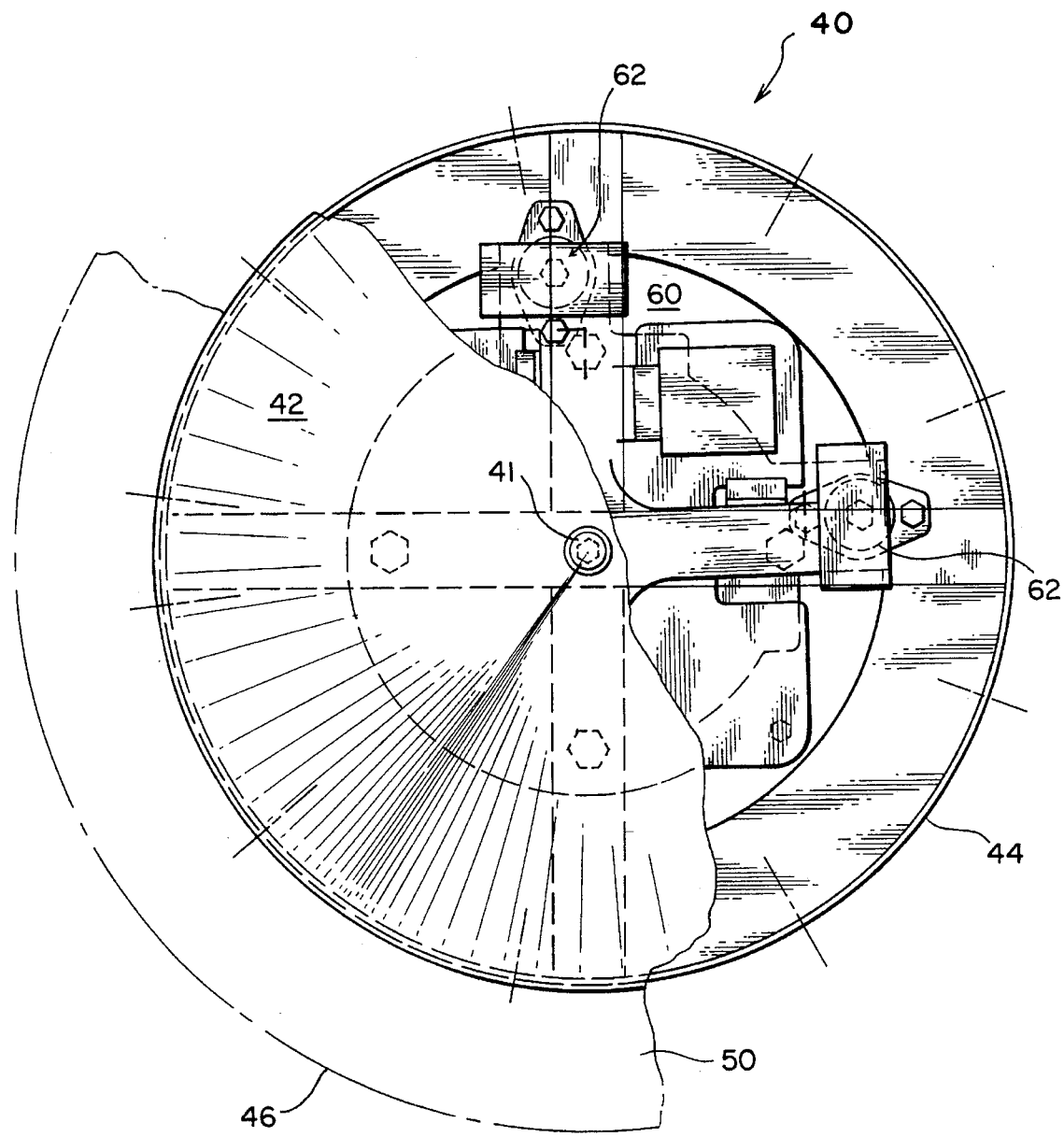

The distribution system in accordance with a preferred embodiment of the invention is illustrated more clearly in FIGS. 3 and 4. As illustrated, a product distribution system 40 includes a cone shaped distribution member 42 for receiving a mass of solid flowable product thereon. The mass of flowable product is supplied from chute 38, or other feed mechanism, which is preferably disposed immediately above and approximately centered over the apex 41 or top of the cone shaped member 42. The supply chute 38 is shown schematically in relatively small size, but would typically have a diameter of about ⅔ of the diameter of member 42. The system 40 also includes a pair of concentric downwardly extending cylindrical walls 44 and 46. A top portion 45 of the first of the downwardly extending cylindrical walls 44 is adjacent to and abutting a base 43 of the cone shaped member 42. A plurality of circularly arranged electromagnetic feeders 48 extend outwardly in a radial direction from the cone shaped member 42. The feeders 48 are disposed below the cone shaped member 42 at or near the bottom 47 of the first cylindrical wall 44 and in close proximity thereto, for moving product away from the first cylindrical wall 44 and toward a plurality of circularly arranged weigh hoppers (not shown).

The second cylindrical wall 46 which acts as a retaining member has a diameter which is greater than the first cylindrical wall 44 and together with the first cylindrical wall 44 forms a circular trough 50 at the base 43 of the cone shaped member 42. The second cylindrical wall 46 is adjustable disposed above the circularly arranged feeders 48 as, for example, by means of a rack and pinion assembly 52 and is movable up or down in a vertical direction to control the volume of product flowing thereunder.

The rack and pinion assembly 52 may be driven by a computer control means 53 which is connected to the assembly 52 by a lead 57. The control means 53 is also operatively connected to feeder 48 by lead 65 so that the control of the height of the cylindrical wall 46 is determined by measuring the amplitude of the vibration of feeder 48 or based on a preset data.

In a first preferred embodiment of the invention a curved plate or outwardly flared skirt 54 is provided at the base of the second cylindrical wall 46 to aid in the flow of product. A similar skirt 55 is important at the bottom 47 of the first circular wall 44 as an aid in moving product away from the first cylindrical wall 44. For products of small particle size, it is important to add a second or flexible skirt 56 which rests against the feeder 48 to minimize the likelihood of any product passing under the wall 44.

As illustrated the cone shaped member 42 is mounted on a plate 58 by means of a bolt 59. The bolt 59 extends through the top of or forms a part of the apex 41. The bolt 59 extends downward where it engages plate 58 and is fixed thereto in a customary manner. This plate 58 also provides structural rigidity for the base 43 of the cone shaped member 42 and to the top portion 45 of the first cylindrical wall 44. In one embodiment of the invention, the plate 58, base 43 and top portion 45 form a unitary structure. A second plate 61 may also be provided near the bottom of the first cylindrical wall 44 for structural rigidity.

In practice the plate 58 forms the bottom of the cone shaped member 42 and top of the first cylindrical wall 44. A set of bolt assemblies 62 is provided to mount the cone shaped member 42 and first cylindrical wall 44 onto a base member 64. The base member 64 may be a solid base or flexibly mounted. In the latter case the distribution system 40, i.e., the portion which includes the cone shaped member 42 and first cylindrical wall 44, may be vibrated by means of a spring 66 to assist in the movement of product as it flows down the cone shaped member 42 and falls into the trough 50.

In the practice of the present invention, it has now been found that raising the cone shaped member 42 from 3 to 5 inches above its normal position and the addition of a pair of concentric downwardly extending walls 44 and 46 improves product flow to the feeders 48. In essence, the first and second cylindrical walls 44 and 46 form a circular trough 50 and result in a product flow in the shape of a thick ring which is formed by the cylindrical walls 44 and 46. In effect, the outer wall 46 acts as a product retainer and the vertical walls 44 and 46 eliminate the thrusting action due to the slope of the cone shaped member 42. The result is that the distribution system provides a more uniform feeding of the product and minimizes unpredictable feeding. It has also been found that in many cases the product can be run through the system without any need to vibrate or rotate the cone shaped member 42.

While the invention has been described in connection with its preferred embodiment, it should be recognized that changes and modifications may be made without departing from the scope of the appended claims.

What is claimed is:

1. A product distribution system for a combination weigher with a plurality of generally circularly arranged weigh hoppers comprising a cone shaped distribution member having an apex and a generally circular base at the bottom thereof disposed above a combination weigher, feed means for feeding a mass of loose solid product onto said cone shaped member and a coaxial cylindrical wall adjacent to said base of said cone shaped member and extending downwardly therefrom, a plurality of radially arranged feeders disposed below said first circular wall but in close proximity thereto and extending radially outwardly therefrom for moving product that falls from said cone shaped member toward the circularly arranged weigh hoppers, a second coaxial circular wall having a diameter which is greater than the diameter of said first cylindrical wall disposed above said feeders at a height which permits a limited amount of solid product to pass thereunder to thereby control the volume of product delivered to the weigh hoppers.

2. A product distribution system for a combination weigher with a plurality of generally circularly arranged weigh hoppers in accordance with claim 1 in which said first cylindrical wall is in an abutting relationship to said base of said cone shaped member.

3. A product distribution system for a combination weigher with a plurality of generally circularly arranged weigh hoppers in accordance with claim 2 in which said feed means is disposed above said cone shaped member.

4. A product distribution system for a combination weigher with a plurality of generally circularly arranged weigh hoppers in accordance with claim 3 in which said cone shaped member is stationary with respect to the combination weigher.

5. A product distribution system for a combination weigher with a plurality of generally circularly arranged weigh hoppers in accordance with claim 3 which includes means for vibrating said cone shaped member.

6. A product distribution system for a combination weigher with a plurality of generally circularly arranged weigh hoppers in accordance with claim 3 which includes an annular curved skirt surrounding said second cylindrical wall at the base thereof.

7. A product distribution system for a combination weigher with a plurality of generally circularly arranged weigh hoppers in accordance with claim 6 in which said first and said second cylindrical walls are vertical.

8. A product distribution system for a combination weigher with a plurality of generally circularly arranged weigh hopers in accordance with claim 6 which includes a computer control means and actuating means for regulating the distance between the second circular wall and the feeder based on a measure of the amplitude of the vibration of said feeders.

9. A combination weigher for weighing a plurality of articles of product having varying weights and delivering a collection of the weighed articles having a combined weight which most nearly approximates a predetermined weight of the type having a plurality of weigh hoppers, each of which receives and weighs a fraction of the collection, means for recording a predetermined target weight, control means for determining which of said weigh hoppers is in a ready state, generating and comparison means for generating the values of combinations of weights in the weigh hoppers which are in the ready state and comparing the values with the predetermined target weight and for selecting combinations of weigh hoppers having a combined weight which most nearly approximates the target weight, product receiving means and means for unloading the weigh hoppers of the selected combination for delivery to the product receiving means and means for loading the weigh hoppers which were unloaded, the improvement comprising a product distribution system for loading the weigh hoppers including a cone shaped distribution member having an apex and a generally circular base at the bottom thereof disposed above the plurality of weigh hoppers, feed means for feeding a mass of loose solid product onto said cone shaped member and a coaxial cylindrical wall adjacent to said base of said cone shaped member and extending downwardly therefrom, a plurality of radially feeders disposed below said first circular wall but in close proximity thereto and extending radially outwardly therefrom for moving product that falls from said cone shaped member toward the weigh hoppers, a second coaxial circular wall having a diameter which is greater than the diameter of said first cylindrical wall disposed above said feeders at a height which permits a limited amount of solid product to pass thereunder to thereby control the volume of product delivered to the weigh hoppers and means for adjusting the distance between the bottom of said second coaxial circular wall and said circularly arranged feeder.

* * * * *